United States Patent

[11] 3,633,456

| [72] | Inventors | William F. Carr<br>Santa Monica;<br>Sidney A. Moses, Culver City, both of Calif. |
|---|---|---|
| [21] | Appl. No. | 838,950 |
| [22] | Filed | July 3, 1969 |
| [45] | Patented | Jan. 11, 1972 |
| [73] | Assignee | McDonnell Douglas Corporation |

[54] POWER-ACTUATED SEPARATION SYSTEM
1 Claim, 7 Drawing Figs.

[52] U.S. Cl..................................................... 89/1 B,
102/49.5, 285/405
[51] Int. Cl..................................................... F42b 15/00
[50] Field of Search............................................. 285/91,
308, 405; 287/64; 102/49.5; 89/1, 1.01

[56] References Cited
UNITED STATES PATENTS

| 2,786,392 | 3/1957 | Niedling | 89/1.5 G |
| 3,486,410 | 12/1969 | Drexelius et al. | 89/1 B |
| 1,585,266 | 5/1926 | Schlafly | 285/405 X |
| 3,200,706 | 8/1965 | Kinard | 89/1.5 F X |
| 3,362,290 | 1/1968 | Carr et al. | 102/49.5 X |
| 3,383,122 | 5/1968 | Richardson | 285/1 |
| 3,505,925 | 4/1970 | Carr | 102/49.5 X |

*Primary Examiner*—Samuel W. Engle
*Attorneys*—Walter J. Jason, Robert O. Richardson and Donald L. Royer

ABSTRACT: A power-actuated system for releasably connecting structures wherein the releasing force does not apply a separation force to the structures being disconnected. Each of the structures to be separated have interlocking flanges along their separation edges which prevent separation in the plane of the structures. In addition, a multiple of releasable locking pins are placed along the mating flanges and when released permit lateral displacement of the structures. When applied to a cylindrical configuration the outwardly directed structure is in section.

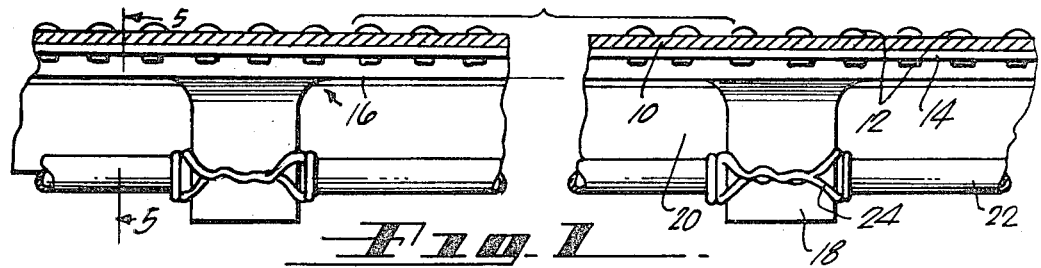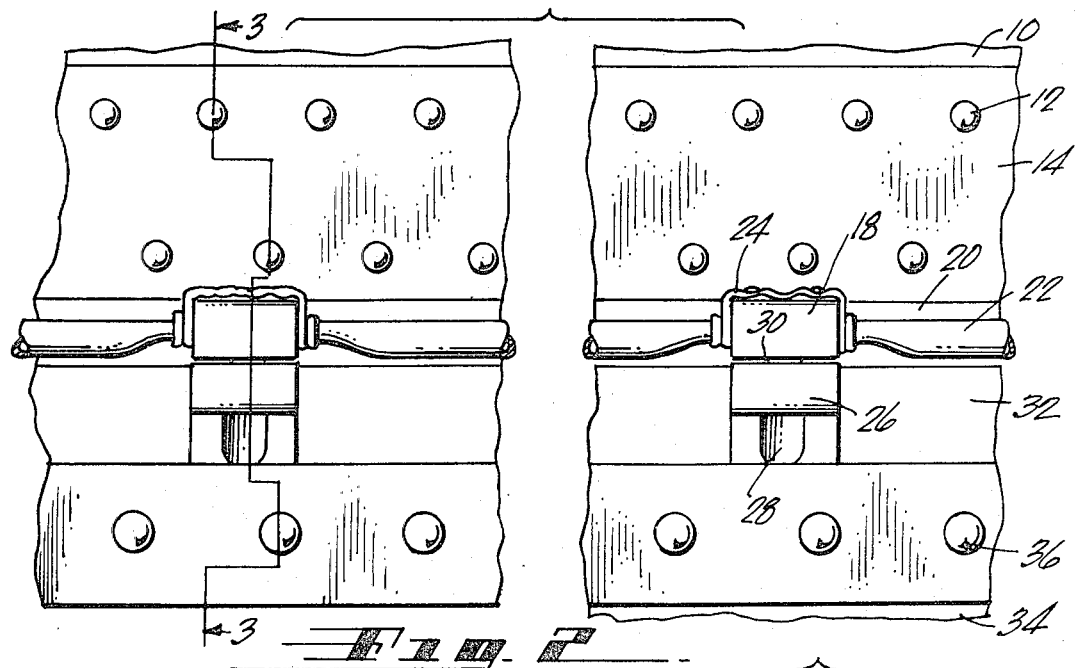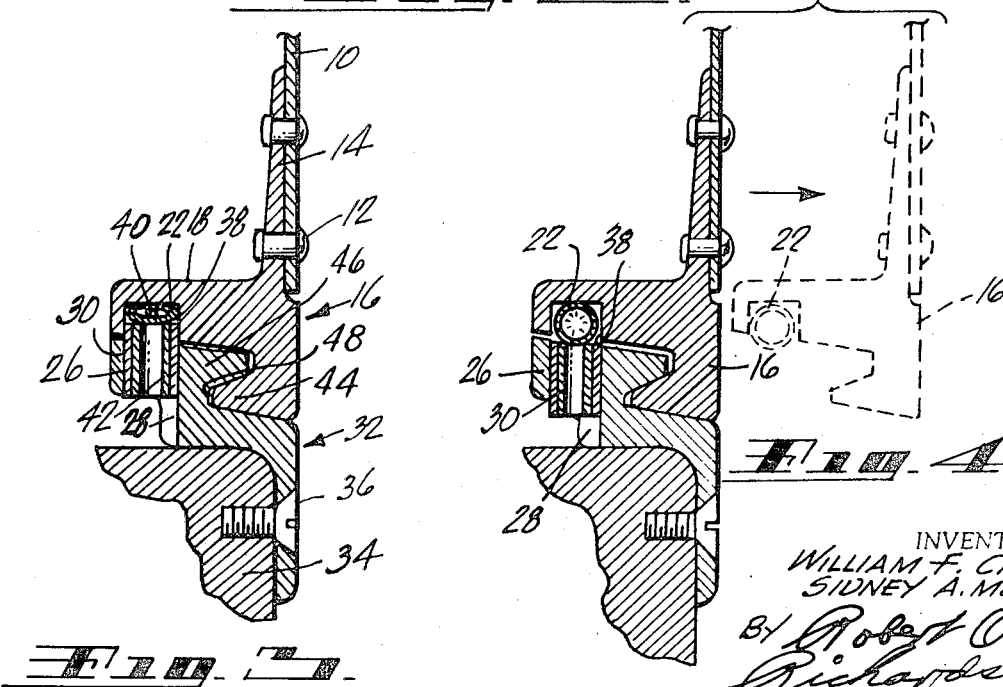

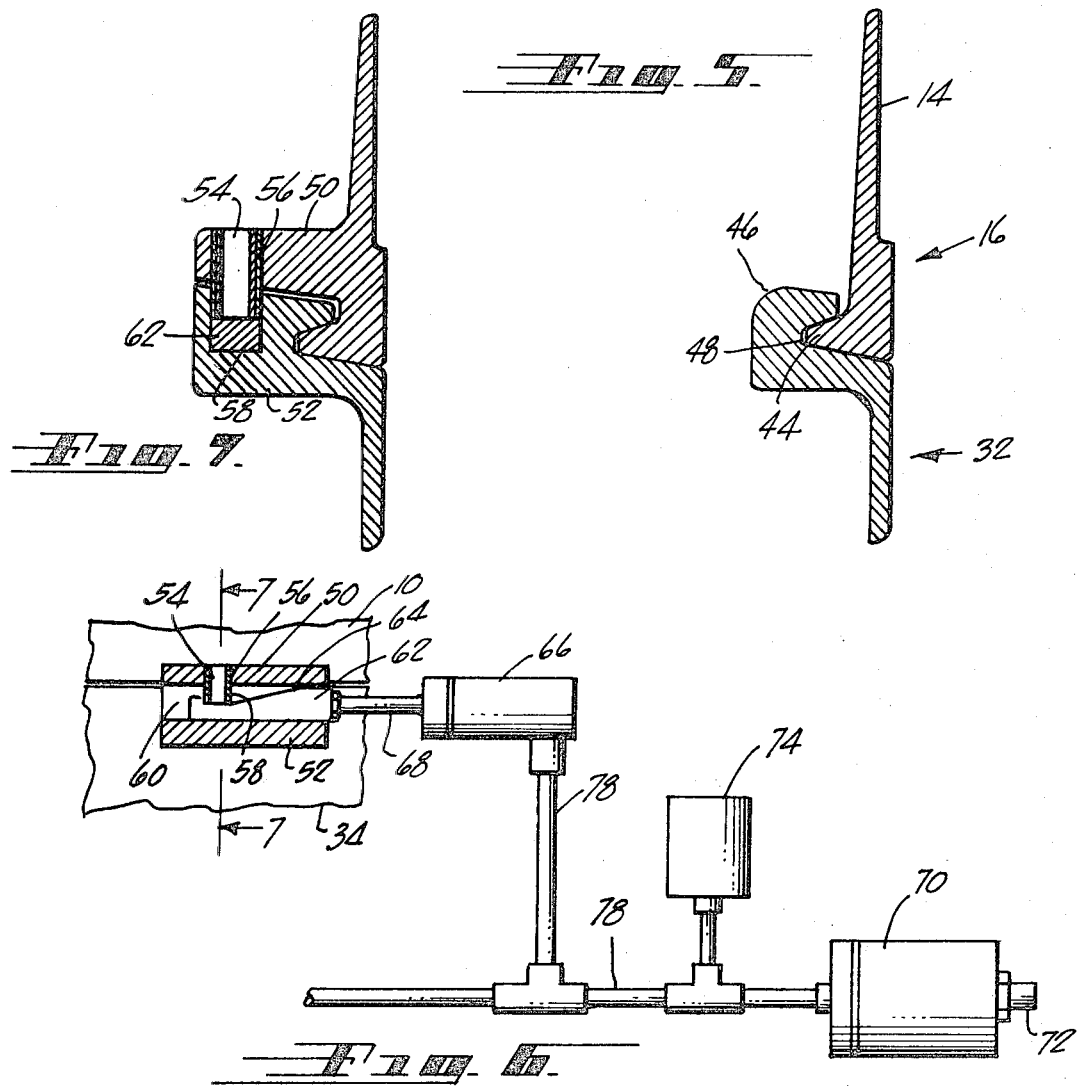

POWER-ACTUATED SEPARATION SYSTEM

CROSS-REFERENCE TO RELATED APPLICATIONS

One embodiment in which the present invention may be utilized is shown in U.S. Pat. No. 3,362,290 for Non-Contaminating Thrusting Separation System issued Jan. 9, 1968. It may be used in connecting the shroud sections 14, 16 to booster 12 in FIG. 1 thereof.

BACKGROUND OF THE INVENTION

There are many occasions when two structures are made integral by a fastening device and a need arises for releasing the fastening device to permit separation of the structures. The release of externally mounted stores of cargo, auxiliary fuel tanks or warfare devices on aircraft are examples. Another example may be found in the space age in the separation of boosters, propulsion mechanisms and other apparatus from a spacecraft as it travels in outer space. A particular example may be found in the previously mentioned patent wherein it is desired to unlock any connections between shrouds 14, 16 and booster 12. In accomplishing this, no forward thrust is desired and the retention of contaminants is also a requirement. One such solution appears in copending U.S. Pat. application Ser. No. 675,436 filed Oct. 16, 1967 for a Structure Release System now U.S. Pat. No. 3,505,925. The present invention relates to other modifications for accomplishing the same result.

SUMMARY OF THE INVENTION

In one example of the present invention, a cylindrical structure (fabricated in two or more longitudinal sections) is attached to a second cylindrical structure by means of interlocking base flanges on both structures. The two flanges are held in a locked position by a series of pins protruding through holes in one flange into a recessed groove in the second. When a noncontaminating separation force, such as described in this invention, is applied to the pins, they are driven from the groove, unlocking the two structures and allowing the cylindrical sections of the one structure to be moved in a lateral direction.

In one application, the separation force may be in the form of an explosive cord contained within a flattened metal tube. Detonation of the explosive cord will expand the tube, releasing the locking pins. In another application a hydraulically operated (or other power-actuated) series of cams forces the locking pins from the retaining groove.

The structure illustrating the present invention is simple and light in construction and the joint formed thereby is able to withstand tensile, compressive, shear and bending loads. There is no contamination from release forces. The sections are held rigidly and securely together, yet a minimum of force is needed to effect their release.

BRIEF DESCRIPTION OF THE DRAWINGS

FIG. 1 is a partial plan view of the separation flange assembly;

FIG. 2 is a partial elevational view of the locking pin assembly;

FIG. 3 is a sectional view taken along the line 3—3 in FIG. 2;

FIG. 4 is a sectional view similar to that of FIG. 3 wherein the locking pin has been moved from its locking position to effect separation of the two structures;

FIG. 5 is a sectional view taken along the line 5—5 of FIG. 1;

FIG. 6 is a schematic illustration with the locking member in section showing an alternate form of power actuation for pin removal; and FIG. 7 is a sectional view taken along the line 7—7 of FIG. 6.

DETAILED DESCRIPTION OF ILLUSTRATIVE EMBODIMENTS

Reference is now made to FIG. 1 wherein there is shown in cross section a structural member 10 such as a wall or housing, for example. Connected to this structure, such as by rivets 12, is the connecting band 14 of a flange member 16. Spaced along this flange member 16 are a plurality of lugs 18 which mate with corresponding lugs connected to a lower structure, not shown. An overlying lip 20 extending from the lower structure overlies as associated lip of flange member 16 in a manner to be hereinafter more fully described. Extending through lugs 18 is a tube 22 containing an explosive material which is used for unlocking all of lugs 18 simultaneously. Within lugs 18 this metallic tube is flattened and the flattened portions are held within the lug through retaining wire 24.

Referring now to the elevational view in FIG. 2, it can be seen that tube 22 is flattened to pass through upper lug 18 and held by retaining wire 24. Detonation of the explosive within tube 22 expands the flattened tube portion within the lug 18. A lower lug 26 has a recess 28 below upper lug 18 to receive the locking pin 30 upon expansion of the tube. This lower lug 26 is an integral part of lower flange 32 which is fastened to a base portion 34 such as with screws 36.

The sectional view in FIG. 3 more clearly illustrates the mounting of the flanges and the cooperation of the upper and lower lugs in the retention and release through movement of the locking pin associated therewith. Here can be seen the upper flange 16 having a connecting band 14 connected to structure 10 through rivets 12. Extending inwardly is an upper lug portion 18, extending over and mating with lower lug 26 on the lower flange 32 which is connected to base 34 through screw 36. A groove or slot 38 extends along the under surface of the upper lug 18 to receive the flattened tube 22 with the explosive cord 40 therein. An associated aperture 42 in the lower lug 26 contains a locking pin 30 which also extends upwardly into groove 38 and is positioned against the underside of the flattened tube 22. This locking pin is self-retaining and remains in this position because of friction against the walls of the aperture 42.

An appropriate recess 28 appears below pin 30 in lower lug 26 so that, upon detonation of the explosive cord 40, the flattened tube 22 assumes a circular configuration and pushes the end of pin 30 out of groove 38 and into recess 28. This position is shown in FIG. 4. After the locking pin 30 has been pushed down into recess 28 and out of groove 38, then flange 16 is free to move outwardly as shown in dotted line and indicated as 16A.

As previously indicated, the lugs containing the locking pins are spaced at intervals along the flanges and the intermediate portion is shown in the sectional view in FIG. 5. In FIG. 5, flange 16 has an upper connecting band 14 to which engagement is made with a structure to be retained thereby. Flange 16 terminates in an inwardly directed lip 44. Lower flange 32 has an overlying lip 46 forming a recess 48 into which lip 44 is positioned on assembly. With this hook arrangement, the structure to which flange 32 is secured and the structure to which flange 16 is secured, may not separate longitudinally but is capable of lateral separation, with flange 16 movable outwardly relative to the structure to which flange 32 is secured.

In FIG. 6 there is shown a similar arrangement of mating of male and female flanges with a connecting pin but in this illustration, the pin is actuated by a power-driven cam. Here an upper structure 10 is to be separated from a lower structure 34. A continuous flange may or may not be used, as desired, but one or more of the locking lugs may be spaced along the line of separation of the two structures. This locking lug consists of an upper lug 50 and lower lug 52 locked together with a locking pin 54 which passes through aligned opening 56, 58 in these lugs. In the lower lug 52 is a transverse groove 60 in which a cammed pin removal element 62 may translate. This element has a cammed surface 64 which pushes pin 54 upwardly out of the lug 52 when it is moved in this view to the left. The movement of the cammed pin removal element 62 may be done hydraulically with cylinder 66 having a piston actuating a drive shaft 68 connected thereto. A hot gas generator 70 with moving piston, igniter 72, surge tank 74 and associated hydraulic lines 78 are supporting equipment whose functions appear obvious and need not warrant further explanation.

A sectional view of the locking lugs 50, 52 are shown in sectional view in FIG. 7 where their similarity can be seen with that structure shown in views 3 and 4. This view is taken along the line 7—7 in FIG. 6 in order to show the relationship of the pin 54, openings 56, 58 and pin removal element 62. It can be seen as the vertical thickness of the element 62 becomes larger, as when the element is moved toward the left in FIG. 6, that it will remove pin 54 from the opening 58 and thus permit lug 50 to move laterally to the right relative to the lug 52.

Having thus described the illustrative embodiments of the present invention, it is to be understood that other modifications will become obvious to one skilled in the art and that these modifications are to be considered as part of the present invention.

We claim:
1. A power-actuated separation system comprising:
a pair of interlocking flange members,
one of said flange members having an inwardly directed lip,
the other of said flange members having an overlying lip preventing longitudinal movement between said flange members,
said other of said flange members having a first lug with an aperture therein,
said one of said flange members having a second lug extending over and mating with said first lug,
a groove in said second lug and an aperture in said first lug in alignment with said groove,
a locking pin extending through said aperture and into said groove,
means for moving said pin out of said groove to thereby permit lateral separation between said flanges,
said means including a flattened tubing with an explosive therein placed in said groove where, upon detonation, said tubing pushes said pin out of said groove.

* * * * *